Feb. 23, 1971    M. G. BROWN, JR    3,566,321
ADHESIVE MOUNTING MEANS FOR A CATHODE RAY TUBE-YOKE COMBINATION
Filed July 23, 1969

INVENTOR.
Malcolm G. Brown, Jr.
BY
ATTORNEY

United States Patent Office 3,566,321
Patented Feb. 23, 1971

3,566,321
ADHESIVE MOUNTING MEANS FOR A CATHODE RAY TUBE-YOKE COMBINATION
Malcolm George Brown, Jr., Lancaster, Pa., assignor to RCA Corporation, a corporation of Delaware
Filed July 23, 1969, Ser. No. 843,922
Int. Cl. H01f 7/00
U.S. Cl. 335—210                                    6 Claims

ABSTRACT OF THE DISCLOSURE

A combination including a cathode ray tube, magnetic field producing means and a body of cured polymeric material holding the yoke in a fixed position on the tube. There is a parting layer of thermoplastic material between the cured polymeric body and at least one of the tube or the yoke. The parting layer of thermoplastic material softens at a temperature above the operating temperature of the yoke and below the temperature at which the yoke is damaged.

BACKGROUND OF THE INVENTION

This invention relates to a novel cathode ray tube-yoke combination, and particularly a cathode ray tube having an external magnetic field producing means mounted thereon.

As is well known, some cathode ray tubes have a deflection yoke attached on the tube in an adjustable semi-permanent manner. The most common manner of attachment is the use of a clamp around the yoke housing. The clamp compresses the housing on the glass and holds the yoke in position with frictional forces. The use of such a clamp has certain disadvantages. First, the clamping force may break the glass or create undue stresses in the glass. Second, a friction device can be moved accidentally. It is important that, after precisely adjusting the yoke on the tube, a positive means permanently fastening the yoke on the tube to be used to retain the yoke in the "set position."

Previously, it was not economically practical to fasten the yoke permanently to the tube with a thermoplastic polymeric material at least because of poor dimensional stability. Because of the dimensional stability requirements at relatively high operating temperatures and during the long operating life of the combination, a cured polymeric material is required. However, fixing the yoke to the tube with a cured polymeric material does not permit economical salvage of the tube and the yoke, particularly where these parts are to be salvaged from factory rejects.

SUMMARY OF THE INVENTION

The novel cathode ray tube-yoke combination comprises a cathode ray tube, a yoke fixedly positioned on a tube with a body of cured polymeric material, and a parting layer of thermoplastic material between the cured polymeric material and at least one of the tube and the yoke.

This novel cathode ray tube-yoke combination has a yoke fixedly mounted on the tube for the operating life of the tube. The parting layer of thermoplastic material softens above the operating temperatures of the yoke and below the temperature at which the yoke is damaged, permitting release of the yoke from the tube without damage to the component parts. The novel combination provides an economy in installation time and quality of alignment of the integral tube-yoke combination which is assembled and precisely adjusted in the factory. In addition, since the thermoplastic material can be readily softened, the costly component parts can be salvaged economically. However, due to the novel combination, the yoke and tube are held with respect to each other in a dimensionally stable structure.

DESCRIPTION OF THE PREFERRED EMBODIMENT

Example 1

Figure 1:
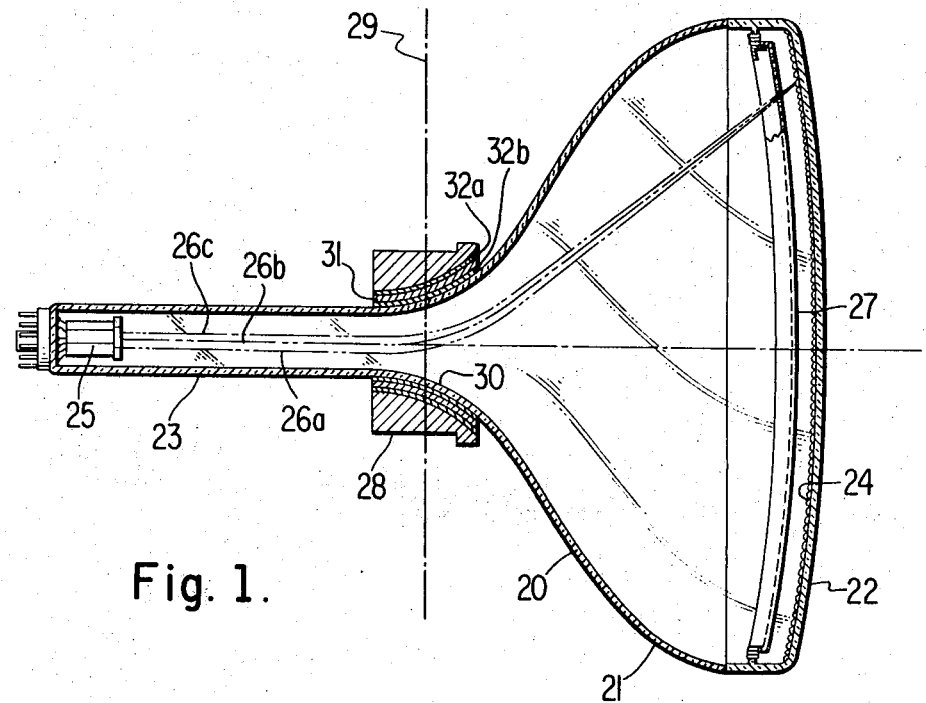
FIG. 1 is a sectional side elevational view showing the preferred construction of a novel cathode ray tube-yoke combination for a color television picture tube-yoke combination.

FIG. 1 shows a color television picture tube of the shadow mask type comprising an evacuated glass envelope 20 having a large funnel portion 21 which terminates at one end in a faceplate 22 and necks down at its opposite end to form a cylindrical neck 23. The faceplate 22 has a three-color phosphor screen 24 on its inner surface. An electron gun assembly 25 positioned in the cylindrical neck 23 includes three individual electron guns, one for each of the three color phosphors on the screen 24. The electron guns each project an electron beam 26a, or 26b, or 26c to strike the phosphor screen 24. Conventionally, a shadow mask (apertured electrode) 27 is positioned near the phosphor screen 24 as shown in FIG. 1.

A magnetic deflection yoke 28 is positioned on the tube near the intersection 30 of the funnel 21 and the neck 23. This yoke position is defined the "deflection plane" 29 or that plane about where the electron beams 26a, 26b and 26c are deflected. Hereinafter, the term "neck" as related to cathode ray tubes is defined to mean that portion of the glass envelope enclosing the electron gun assembly and extending to the yoke position. The yoke 28 comprises two pairs of opposed magnetic field producing coils mounted in a housing.

A body 31 of cured polymeric material approximately 0.30 inch thick fills the space between the yoke 28 and the glass envelope 20 permanently fixing the component parts with respect to one another. A "cured" polymeric material is a material that has chemically interacted to form a polymeric solid body that cannot be melted or liquified by heating. The cured body of polymeric material also must adhere strongly without chemical interaction to contained surfaces to retain a fixed structure. The body 31 of polymeric material shown in FIG. 1 is a cured polyurethane, prepared using a two-component foam mix sold under the designation 34–508 Polylite and 34–625 Polylite marketed by Reichhold Chemical, Inc., White Plains, N.Y. The mix consists of equal parts of 34–508 Polylite and 34–625 Polylite. Since this mix has a low viscosity, it flows away from the area of application if gasketing is not used to contain it. In that the space between the yoke and tube where the mix is applied is not consistent depending on manufacturing tolerances, the use of a gasketing means is not convenient. A thickening agent is added to the mix to reduce the viscosity and contain the mix in the space. One artificial thickening agent which works satisfactorily is sold under the desgnation Cab-O-Sil M–5 marketed by the Cabot Co., Boston, Mass. With this thickening agent added to the polyurethane mix, a preferred formulation contains 27.6 grams 34–625 Polylite, 27.6 grams 34–508 Polylite and 0.4 gram Cab-O-Sil M–5. This formulation foams within 1½ to 2½ minutes and is fully foamed almost simultaneously with the time it fills the space between the yoke and the tube. This formulation sets in 5 to 8 minutes and is fully cured (at room temperature) in 48 hours.

There are two continuous parting layers 32a and 32b of thermoplastic material, one layer 32a (between the yoke 28 and the body of polymeric material 31) which covers the inner surface of the yoke 28 and the other layer 32b (between the body 31 of polymeric material and the glass envelope 20) which covers the outer surface of the neck 23. The parting layers 32a and 32b must be continuous or otherwise the body 31 of cured polymeric material may adhere to the inner surface of the yoke 28 or the outer surface of the glass envelope 20, and prevent non-destructive removal of the yoke from the tube. The parting layers 32a and 32b of thermoplastic material shown in FIG. 1 are each of a vinyl copolymer resin formulation which consists essentially of a 20% acetone solution of a mix prepared from equal parts of resins designated Bakelite Vinyl Copolymer VMCC and Bakelite Vinyl Copolymer VMCH sold by Union Carbide Corp., Plastic Division, New York, N.Y. The solvent is required for application and evaporates leaving a parting layer. The softening temperature of the 50:50 mix of the Union Carbide copolymers VMCH and VMCC is approximately 110° C.

During tube operation, the normal operating temperature of the yoke shown in FIG. 1 is about 65° C. The maximum temperature the yoke can withstand without damage is about 120–130° C. Therefore, since the parting layers 32a and 32b soften at about 110° C., they will not soften during normal tube operation, and they can be softened at about 110° C. without damage to the yoke.

A preferred method of application of the parting layers 32a and 32b is by spraying. Spray application results in a parting layer approximately .001 to .0015 thick on the yoke inner surface and on the glass envelope 20 using appropriate shields to allow the coating of only the surface in contact with the body of polymeric material 31. One method of assembling the combination after application of the parting layers 32a and 32b is to position the yoke 28 adjacent to the tube as shown in FIG. 1 and mount both units in an alignment support fixture. The assembly, including tube, yoke and fixture, is loaded into a testing means. Then the yoke 28 is adjusted to the optimum position and held in position mechanically. At the optimum position the spacing between the yoke and the tube is approximately 0.3 inch. The assembly is then removed from the testing means and positioned tilted with the neck end of the tube down at an approximate 30° angle. Approximately 25–30 grams of liquid uncured polymeric material 31 are poured into the space between the neck 23 and the yoke 28. A thickening agent as previously described, added to the mix before pouring, eliminates the need for gasketing. With the preferred formulation, the material fills the space as it foams and is almost completely foamed when it reaches the end openings between the yoke and the tube. After the foam has fully set, the tube is retested to determine whether the yoke is properly adjusted. The foam fully cures in 48 hours at room temperature. After curing, the combination is a non-adjustable fixed assembly (except when salvaging technique is employed) for the normal operating life of the tube.

To salvage the yoke 28 shown in FIG. 1, the parting layers 32a and 32b are slowly heated to about 110° C. at which temperature the yoke 28 and body 31 of polymeric material can be easily removed from the tube. The yoke 28 is removed by slowly rotating and sliding the yoke with respect to the tube. Then the polymeric material is stripped away and disposed of as required. In a test, the parting layers were heated to 100° C. and the parting layers 32a and 32b maintained the yoke in its fixed position. At about 110° C., the parting layers soften and the yoke is removed without demage. Approximately 15 minutes is necessary to reach the salvage temperature of 110° C. since heat must be applied to the parting layers at a rate that will not damage the tube or yoke.

When the color television tube shown in FIG. 1 is used as a display device, the electron gun assembly produces three electron beams 26a, 26b and 26c which excite the phosphor screen 24. Magnetic fields produced in the yoke 28 bend or deflect the electron beams 26a, 26b and 26c horizontally and vertically in a particular scan pattern to excite the phosphor screen thereby generating a visual display on the screen 24. The apertured electrode 27 shadows the electron beams so that selected portions of the phosphor screen 24 are excited.

Example 2

Figure 2:
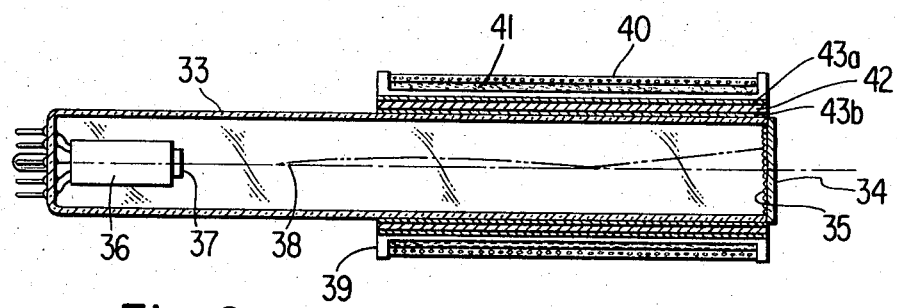
FIG. 2 is a sectional side elevational view showing the preferred construction of a novel cathode ray tube-yoke combination for a camera tube-yoke combination.

FIG. 2 shows a camera tube comprising an evacuated cylindrical glass envelope 33 with a faceplate 34 having a target screen 35 at one end and an electron gun assembly 36 at the opposite end. The electron gun assembly 36 comprises one electron gun 37 which projects an electron beam 38 to strike the target screen 35. A yoke 39 is positioned adjacent the glass envelope 33 as shown in FIG. 2. The yoke 39 includes a magnetic focusing coil 40 and two pairs of magnetic deflection coils of which only one pair of coils 41 is shown in FIG. 2. A body 42 of cured polymeric material approximately 0.01 inch thick, prepared using a two-part polyurethane mix designated PR–1538 part A and PR–1538 part B and sold by Products Research Co., Los Angeles, Calif., fills the space between the yoke 39 and the glass envelope 33. The preferred mix is 32 parts part A and 100 parts part B by weight or volume. This material is mixed under a vacuum to prevent foaming. Curing is obtained at a temperature of 80° C. for 8 hours.

Two parting layers 43a and 43b of theromplastic material shown in FIG. 2 are of the same vinyl copolymer resins and structure as those described in Example 1. These parting layers 43a and 43b should be continuous between the body 42 of polymeric material and the outer surface of the tube and the inner surface of the yoke to permit easy release of the yoke for salvage.

The normal operating temperature of the tube shown in FIG. 2 is about 85° C., and the minimum temperature the yoke can withstand without damage is about 120–130° C. Since the parting layers 43a and 43b soften at 110° C., they will maintain the yoke fixed during the 80° C. approximately normal operating temperature of the tube and soften below the approximate 120° C. temperature at which damage to the yoke would result.

In assembling the embodiment of the tube shown in FIG. 2, layers of thermoplastic material approximately .001 to .0015 inch thick, as previously described, are sprayed on the yoke inner surface and on the outer surface of the glass envelope. The yoke is positioned adjacent the tube with the target screen up in a fixture which has gasketing means and an input port in the space between the yoke and the tube at the bottom and an output port at the top. The space between the yoke and the tube filled by the cured body of polymeric is approximately .010 inch. A preferred filling procedure is to insert the liquid uncured polymeric material in the bottom port under pressure until it can be visually seen at the top port. After the polymeric material has solidified, the tube-yoke combination is removed from the fixture and cured at 80° C. for 8 hours.

To salvage the yoke 39 shown in FIG. 2, the parting layers 43a and 43b are slowly heated to 110° C. When the parting layer reaches a temperature of 110° C., the yoke 39 can be twisted and slipped from the tube. After the yoke is removed the polymeric material which may remain with the tube or yoke may be stripped away and disposed of as required. The yoke can be salvaged without damage by uniformly slowly heating the parting layers 43a and 43b to about 110° C., since the operating temperature of the tube is about 85° C. and the temperature at which damage to the yoke can result is 120°–130° C.

When the camera tube shown in FIG. 2 operates as a sensing device, the electron gun 37 emits an electron beam 38 to strike the target screen 35. Magnetic fields produced in the yoke 39 bend or deflect the electron beam 38 in a prescribed pattern to scan the target screen 35.

General considerations

The novel combination may be used for any cathode ray tube in addition to the color television tube shown in Example 1 and the camera tube shown in Example 2. Although the yoke described in Example 1 has only one magnetic field producing means for magnetic deflection, it can include other magnetic field producing means for uses such as color correction and color convergence. A yoke includes at least one magnetic field producing means and normally includes electrical connection means and a housing. It may also have magnetic shielding means. The yoke can also include one or more packaged circuits such as a convergence or a focusing circuit. A yoke-tube combination of this type may be part of a self-contained module which is assembled into a receiver. This module may be a direct replacement for service failures.

A segmented yoke can also be used instead of the one-piece yoke described in Examples 1 and 2. This would be necessary if the shape of the glass envelope prevented sliding of the yoke from the tube. In this situation, the layers of parting material may also be applied to the mating surfaces of the segment parts as required to salvage the yoke in the manner peviously described. Although the glass envelopes are described to have specific shapes in Examples 1 and 2, any envelope shape that can be used for a cathode ray tube and that permits fixing the yoke adjacent the tube is suitable.

Although specific materials for making bodies of cured polyurethane are described, other materials are suitable. Such materials include Polylite ED-1140 (prepolymer), Polylite ED-1141 (resin), Polylite ED-1142 (resin), and Polylite ED-1143 (resin) and sold by Reichhold Chemical Inc., White Plains, N.Y. The following formulations were tested and performed satisfactorily:

(1) 25 grams ED-1140, 30.5 grams ED-1141, 0.2 gram Cab-O-Sil M-5
(2) 25 grams ED-1140, 31 grams ED-1142, 0.2 gram Cab-O-Sil M-5
(3) 25 grams ED-1140, 31.5 grams ED-1143, 0.2 gram Cab-O-Sil M-5.

The resultant foamed materials of the above formulations are fire retardant per ASTM 1692-67T test method for flammability of plastic sheeting and cellular plastics. These formulations also meet the following requirements for the body of polymeric material: (1) produce materials which withstand the operating temperature of the tube, (2) produce no distortion of the yoke-tube electrical alignment during the curing step, (3) provide good electrical resistance between the yoke and the tube, and (4) produce a material which provides good adhesion with the parting material.

Other cured materials, such as self-curing silicone rubber, rubber compounds, or epoxy compounds, may be used as the body of polymeric material. Other thermoplastic materials for the parting layer, such as hot melt polypropylene or wax, may be used. The specific formulation for the cured material must be selected so that cross polymerization or any other reaction with the parting layer will not occur. Cross polymerization or a reaction with the parting layer may cause the yoke to stick to the tube when the salvage technique is applied. It is preferred that the cured material have properties similar to those for the cured polyurethane described in Example 1.

Although the cured body of polymeric material is described to be approximately 0.3 inch thick in Example 1 and approximately 0.01 inch thick in Example 2, other thicknesses may be used. The size of the spacing between the yoke and the tube determines the resulting thickness of the cured body and the method which is chosen to fill the space with the uncured mix. In Example 1, the space is of sufficient size to permit easy filling by a direct pouring of the uncured mix, while in Example 2 the smaller size space requires providing the uncured mix under pressure. The minimum and maximum cured body thicknesses permissible must achieve complete filling of the space between the yoke and the tube, must result in a dimensionally stable structure, and must permit use of an economical method for filling with uncured mix.

Although a specific vinyl copolymer resin parting material is described in Examples 1 and 2, other vinyl polymers, such as a polyvinyl acetate, may be used. One formulation for preparing the layers 32a, 32b, 43a and 43b of parting material is a polyvinyl acetate resin solution designated by the trade name Elvacet 41-75 sold by E. I. du Pont de Nemours Co., Wilmington, Del. A formulation of a 5% solution of Elvacet 41-95 in a methyl acetate solvent may be used. Other solvents such as ketones and certain esters may also be substituted for the solvent in Examples 1 and 2. The solvent serves as a vehicle for application of the thermoplastic material, and the concentration of the solution affects the thickness of the layers of thermoplastic material. Using a 5% solution of Elvacet 41-95 a layer less than .001 inch thick results, and using a 20% solution an approximately .0015 inch thick layer results. Other total layer thicknesses of the parting layers can be obtained by multiple layer application.

Pigments and plasticizers may also be added to the thermoplastic material to obtain certain other desirable characteristics such as color and resilience. Examples 1 and 2 describe the parting layers on both the inner surface of the yoke and the other surface of the tube. This permits easy removal of the body of polymeric material from both the yoke and the tube as well as removal of the yoke from the tube. The yoke can be removed from the tube using only one parting layer. The location of the parting layer determines where the yoke would release from the tube and on which surface the body of polymeric material would remain. As previously mentioned, a parting layer may also be applied to mating surfaces of a segmented yoke to permit employment of the modified salvage technique described.

The softening temperature of the thermoplastic copolymer for the parting layers described in Example 1 can be modified by changing the mix proportion from the designated 50:50 proportion. The Union Carbide VMCH resin used alone melts about 155–170° C., and the VMCC resin used alone melts about 130–145° C. Using different proportions of these resins, a resin having a particular softening temperature can be formulated. After the tube operating temperature and the temperature at which damage to the yoke would result are known, a formulation for producing a vinyl polymer or copolymer parting layer can be made to soften at a selected temperature between these temperature extremes.

What is claimed is:

1. In combination, a cathode ray tube comprising a glass envelope, a means for producing a magnetic field positioned over said envelope, a body of cured polymeric material holding said means in a fixed position adjacent said envelope, and a continuous parting layer of thermoplastic material between said cured polymeric body and at least one of said envelope and said means.

2. A cathode ray tube-yoke combination defined in claim 1 comprising a cathode ray tube, a yoke mounted on said cathode ray tube, a body of cured polymeric material fixing said yoke adjacent to said tube, and continuous parting layers of a thermoplastic material on the surfaces to be fixed of both said tube and said yoke.

3. A combination according to claim 1 wherein said body of cured polymeric material is a foamed polyurethane resin.

4. A combination according to claim 1 wherein said body of cured polymeric material is a defoamed polyurethane resin.

5. A combination according to claim 1 wherein said parting layer of thermoplastic material softens above the operating temperature of said tube and below the temperature at which said magnetic fields producing means are damaged.

6. A combination according to claim 1 wherein said means for producting a magnetic field is a yoke fixed in a nonadjustable manner at an optimum position adjacent the neck of said tube.

References Cited

UNITED STATES PATENTS

| 3,032,678 | 5/1962 | Glaser | 335—210X |
| 3,497,843 | 2/1970 | Collie | 335—210 |

GEORGE HARRIS, Primary Examiner

U.S. Cl. X.R.

313—75